United States Patent [19]

Jachowsky

[11] Patent Number: 5,349,150
[45] Date of Patent: Sep. 20, 1994

[54] METHOD OF MANUFACTURE OF A PROFILED SEGMENT

[75] Inventor: Norbert Jachowsky, Huenfeld, Fed. Rep. of Germany

[73] Assignee: Maschinenbau Herbert GmbH & Co., Huenfeld, Fed. Rep. of Germany

[21] Appl. No.: 100,614

[22] Filed: Jul. 30, 1993

Related U.S. Application Data

[62] Division of Ser. No. 736,297, Jul. 29, 1991, Pat. No. 5,261,804.

[51] Int. Cl.$^5$ .......................... B23H 9/00; B29C 33/00
[52] U.S. Cl. ..................... 219/69.17; 29/416; 425/47; 425/812
[58] Field of Search .............. 219/69.17, 69.12; 76/107.1; 29/416; 83/54, 651.1; 425/28.1, 46, 47, 812

[56] References Cited

U.S. PATENT DOCUMENTS

| | | | |
|---|---|---|---|
| 2,756,460 | 7/1956 | Heintz, Jr. | 425/28.1 |
| 4,411,175 | 10/1983 | Takahashi et al. | 29/416 |
| 4,543,050 | 9/1985 | Takahashi et al. | 425/28.1 |
| 4,691,431 | 9/1987 | Hayata | 425/28.1 |
| 4,708,609 | 11/1987 | Yoda et al. | 425/28.1 |
| 4,760,762 | 8/1988 | Rudneu et al. | 76/107.1 |
| 5,234,326 | 8/1993 | Galli et al. | 425/46 |

FOREIGN PATENT DOCUMENTS

| | | | |
|---|---|---|---|
| 514161 | 11/1992 | European Pat. Off. | 425/28.1 |
| 60-228032 | 11/1985 | Japan | 76/107.1 |

*Primary Examiner*—Geoffrey S. Evans
*Attorney, Agent, or Firm*—Flynn, Thiel, Boutell & Tanis

[57] ABSTRACT

In order to assure a safe gas discharge from the cavity formed in the tire-vulcanizing mold during the forming of the tire blanks, the profiled segment (1) be divided along at least one separating line (2) into at least two partial segments (3 to 8), that the separating line (2) extends substantially radially in relationship to the tire mold, and that the separating line (2) cuts the areas of the tire-vulcanizing mold to be vented. Manufacture of the segments is done such that the profiled segment (1) is first manufactured in one piece and is thereafter divided into the partial segments by means of a cutting operation, such as a wire cutting spark-erosion cutting operation, leaving behind a narrow cutting line (FIG. 1).

3 Claims, 3 Drawing Sheets

```
┌─────────────────────────────┐
│   CONSTRUCTING THE          │
│   PROFILED SEGMENT          │
└─────────────────────────────┘
              │
              ▼
┌───────────────────────────────────────────────────────┐
│         DIVIDING BY A SPARK-EROSION                   │
│   CUTTING OPERATION THE PROFILED SEGMENT              │
│ ALONG AT LEAST ONE SEPARATING INTERFACE INTO AT       │
│      LEAST TWO PARTIAL PROFILED SEGMENTS              │
└───────────────────────────────────────────────────────┘
              │
              ▼
┌───────────────────────────────────────────────────────┐
│         CHOOSING IRREGULAR AND NONPLANAR              │
│   SURFACE PATTERNS SO THAT A LOCATION OF THE          │
│   SEPARATING INTERFACE INTERESTS AREAS OF THE         │
│    TREAD PATTERN REQUIRING VENTILATION WHEN           │
│   THE PARTIAL PROFILED SEGMENTS FORM A PART           │
│          OF THE TIRE VULCANIZATION MOLD               │
└───────────────────────────────────────────────────────┘
```

METHOD OF MANUFACTURE OF A PROFILED SEGMENT

This is a division of Ser. No. 07/736 297, filed Jul. 29, 1991, now U.S. Pat. No. 5,261,804.

FIELD OF THE INVENTION

The invention relates to a method for the manufacture of a profiled segment for a tire-vulcanizing mold.

BACKGROUND OF THE INVENTION

A tire-vulcanizing mold is usually used for the manufacture of tires, which mold is built of several profiled segments. In order to be able to place the tire into the mold or remove same from the mold after the vulcanizing operation, the individual profiled segments can be moved relative to one another. Vulcanizing molds are known in which a division into individual profiled segments is done relative to the center of the tire, however, the vulcanizing mold can also be divided in radial direction into individual profiled segments. Such a tire-vulcanizing mold is known, for example, from DE-OS 3631533.

It is necessary, during the manufacture of a tire, to remove the gases existing in the tire-vulcanizing mold during the forming of the tire blank. The difficulty, in contrast to common molds, is that the tire, in particular the tread surface, is designed to have many profiles so that the tire-vulcanizing mold is divided into individual chambers by the barriers and ribs needed for the manufacture of such grooves and slots. Thus, gases collect in the respective chambers during the forming process and must be discharged from each one of these chambers.

It is known from the state of the art to solve this venting problem in such a manner that the profiled segments are equipped with individual bores. The gases can be removed through the bores, however, the rubber mixture also enters at the same time the bore and flows at least partly through the bore so that peg-like projections exist on the finished product, which peg-like projections are formed by the material in the bores. Thus, the finished tires must be finish-worked in order to remove these projections or rubber nipples. This requires an additional manufacturing expense. Also these projections or nipples create additional waste, which should be avoided.

SUMMARY OF THE INVENTION

The basic purpose of the invention is to provide profiled segments for a tire-vulcanizing mold which guarantee a safe gas discharge during the vulcanizing operation and which are simple in design and easy to manufacture.

This purpose is attained according to the invention by individual profiled segments being divided such that an interface extends substantially parallel to a plane of rotation in relationship to the tire mold, and that the interface cuts through the area of the tread pattern in the tire-vulcanizing mold, requiring ventilation.

The profiled segment of the invention has a number of significant advantages. Since the interface cuts through the areas of the tread pattern in the tire-vulcanizing mold to be vented, it is assured that all gases to be discharged can be discharged. The danger of individual chambers filling up with gases in a nondesired and uncontrolled manner is thus completely eliminated. To divide the profiled segment into several partial profiled segments creates the possibility to construct suitable venting gaps. Furthermore, it is possible to separate the individual partial profiled segments from one another without any great difficulties so that the state of the interfaces can be checked or the gap formed between adjoining adjacent segments can be cleaned.

Furthermore, the invention has the important advantage that the width of the gap formed at the interfaces can be adjusted in the simplest manner such that the gases escape, however, a rubber mass cannot penetrate the gap. Thus, nipples or ribs cannot at all be created. Consequently, any type of finishworking, as it is needed in tire-vulcanizing molds, is eliminated. Furthermore, the aesthetics of the finished product also meets the highest standards.

A particularly favorable further development of the invention provides that the partial profiled segments are received in a mounting and are fixed together. This fixation can be done by a reciprocal clamping of the partial profiled segments, however, it is also possible for the mounting to form only a type of a frame in which the individual partial profiled segments are received such that a gap continues to exist in the area of the interfaces. A secure positioning of the partial profiled segments is achieved in both cases so that the partial profiled segments cannot move relative to one another during the vulcanization operation.

In order for the individual partial profiled segments to be fixed exactly and nonmovably with respect to one another, it is furthermore advantageous when the mounting has a clamping device for effecting the reciprocal clamping of the partial profiled segments substantially perpendicularly with respect to the interfaces. This prevents in particular the partial profiled segments from moving during the vulcanization operation relative to one another such that the gap formed at the interface is enlarged, which would have the result that the rubber material would penetrate into the gap. At the same time, it is possible to separate the individual partial profiled segments from one another by releasing the clamping device in order to, for example, clean the gap in the region of the interfaces. This is particularly advantageous when an additional separating means is applied to the tire-vulcanizing mold prior to the vulcanization operation which could lead to the gap plugging up or becoming dirty and thus to an insufficient gas discharge.

In order to further assure that the gaps between the partial profiled segments become smaller during the reciprocal clamping of the partial profiled segments due to an increasing clamping force, it is particularly favorable when the interface is arranged at an angle smaller than 45° with respect to the clamping direction. If the interface would extend parallel with respect to the clamping direction, then the applied clamping force would have practically no effect on the width of the gap. A particularly favorable development provides that the interface extends substantially perpendicularly with respect to the clamping direction. Since this cannot always be realized since the tire profile, particularly due to the arrangement of the ribs, requires an additional venting at other points, the surfaces at the interface are irregular and nonplanar, that is, they extend usually wavelike or zigzag-like.

With respect to the method of the invention, the basic purpose of the invention is attained by the profiled segment being first constructed in one piece and thereafter divided into the partial profiled segments along the interface line. The one-piece design can be done, for example, by a casting operation.

Thus, the dividing of the so created profiled segment into the individual partial profiled segments is done according to the invention with a very narrow cutting width in order to prevent a change of the profiled mold or for such to occur during the dividing task. Preferred methods for dividing the profiled segment are for example a spark-erosion method using a wire-erosion machine. It is thus possible when guiding the cut to consider both which areas of the tire profile need a special gas discharge, and also to place the cutting line such that the individual partial profiled segments can be moved in a simple manner relative to one another, namely, can be separated from one another or can be pressed toward one another.

In dependency of the profile design, the shape of the tire-vulcanizing mold and other operating parameters, it is possible to divide the profiled segment into several partial profiled segments through several interfaces, with the respective interfaces, extending substantially in the same direction with respect to one another, namely they are substantially parallel with respect to one another.

BRIEF DESCRIPTION OF THE DRAWINGS

The invention will be described hereinafter in connection with one exemplary embodiment and the drawings, in which.

DETAILED DESCRIPTION

Figure 1:
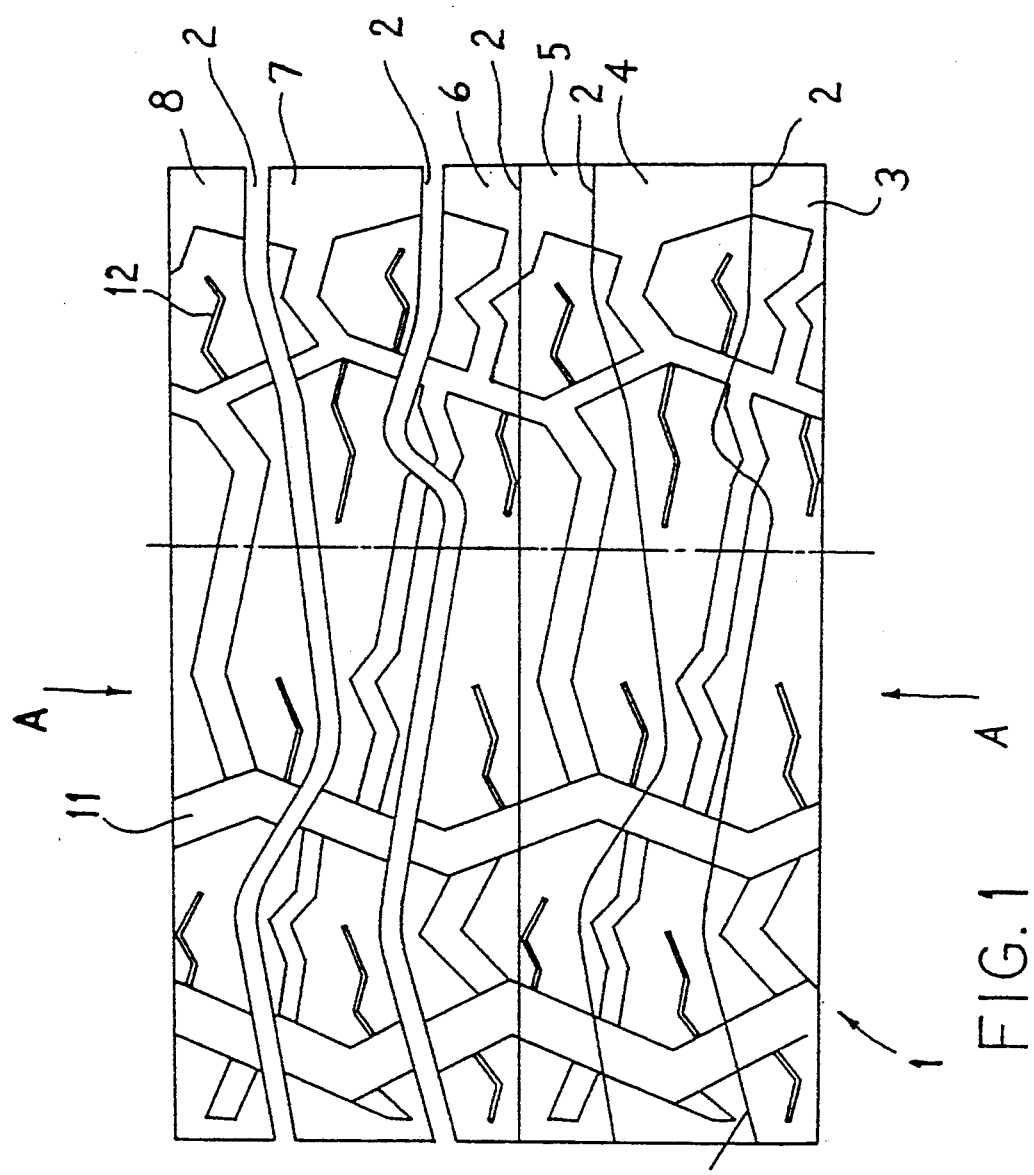
FIG. 1 is a schematic plan view of the inside of plural partial profiled segments of the invention, with the profiled segments being shown slightly separated from one another.

FIG. 1 is a view of the profiled side of a profiled segment 1, which is a part of a tire-vulcanizing mold. The individual partial profiled segments form hereby the peripheral area of a tire mold and are used in particular to produce the tread-surface structure of the tire. The type of arrangement, clamping and operation of the individual partial profiled segments is known from the state of the art, for example from DE-OS 3631533, so that a detailed description thereof is not needed.

In order to simplify the illustration of the profiled segment of the invention, the same has been illustrated in FIG. 1, so that the tread forming areas of the vulcanizing mold are shown in the plane of the drawing figure.

The illustration of FIG. 1 shows that the profiled segment has several profile barriers 11 and ribs 12, which form a negative mold for the tire profile to be produced.

FIG. 1 shows furthermore several interfaces 2 which extend substantially parallel to a plane of rotation, in relationship to the tire to be produced, through the profiled segment so that the annular profiled segment is divided into individual annular partial profiled segments 3 to 8. The arrangement and design of the individual annular interfaces 2 are chosen such that these are each guided through the areas of the tread design on the profiled segment 1 to be vented. Accordingly, the opposing surfaces of the lowermost annular interface 2, in FIG. 1 are designed wavelike, just like the interface 2, which is the next one thereabove. The middle interface extends substantially in the form of a flat plane since the dividing chambers formed by the individual ribs 12 or profile barriers 11 can be particularly well vented with this design of the interface.

The lower half of FIG. 1 shows a situation, in which the individual partial profiled segments 3, 4, 5 are clamped together. Thus only very narrow gaps are constructed in the area of the interfaces 2, which gaps are sufficiently wide in order to discharge gases, however, have a width, which is not sufficiently wide in order to enable the rubber mass to be vulcanized to enter. The partial profiled segments 6, 7 and 8 are each separate from one another in the upper half of FIG. 1 so that the gap formed in the area of the interface 2 is particularly clearly visible.

Furthermore, the arrows A—A in FIG. 1 identify the clamping direction or moving direction in which the individual partial profiled segments 3 to 8 are clamped together or are pressed together in order to achieve the operative state shown in the lower half of FIG. 1.

Figure 2:
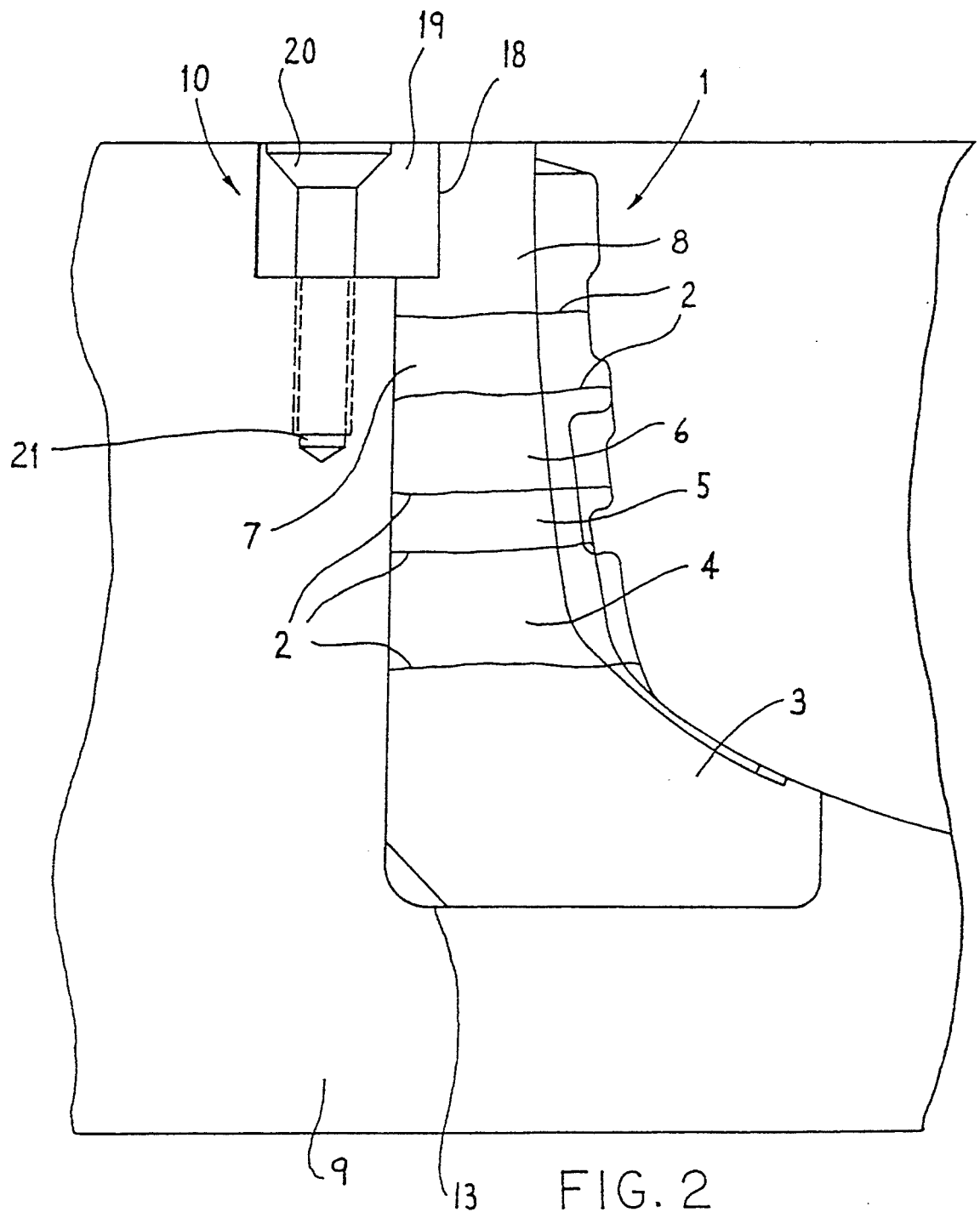
FIG. 2 is a simplified side view of a mounting for the plural partial profiled segments.
Figure 3:
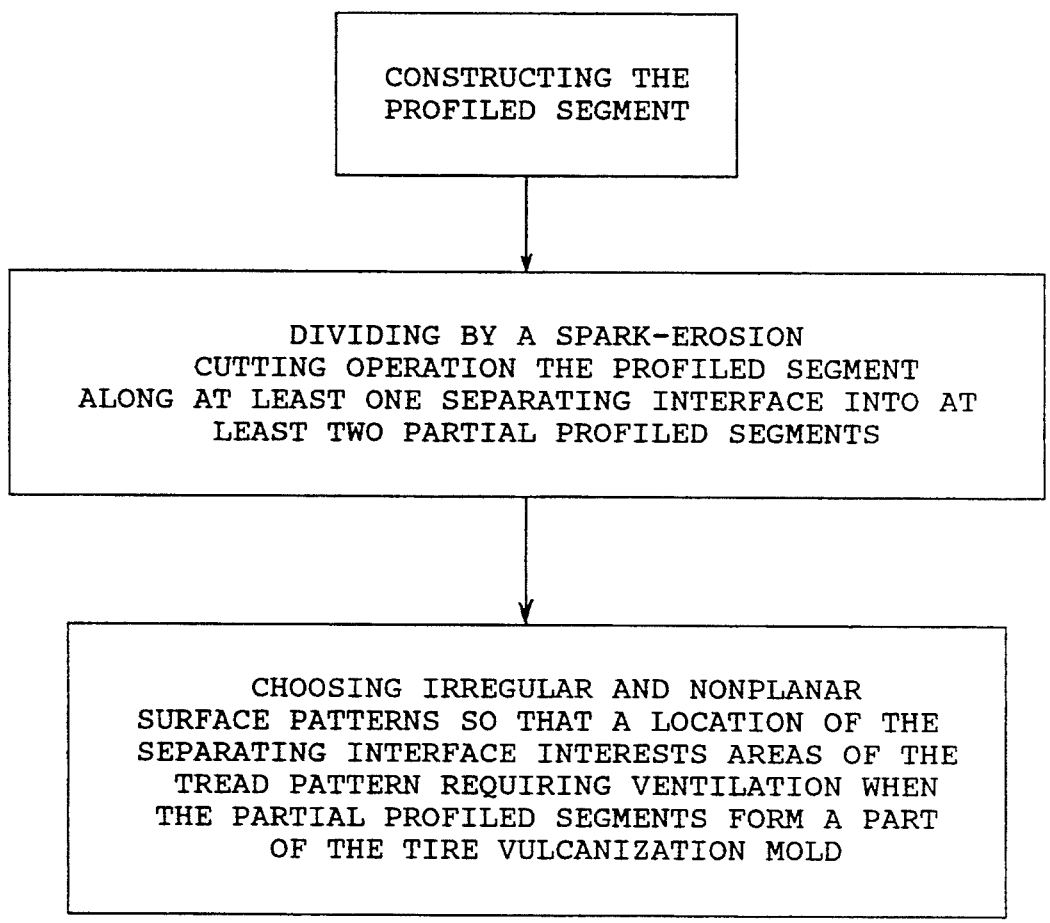
FIG. 3 is a flow chart illustrating the method of manufacturing a profiled segment of a tire-vulcanization mold.

FIG. 2 shows that the mold member 9 has a recess 13 which is designed like a groove and is dimensioned such that the individual partial profiled segments 3 to 8 can be received and safely positioned. The partial profiled segments shown in the side view in FIG. 2 have a groove 18 into which a clamping member 19 can be moved. Corresponding with the design of the tire-vulcanizing mold, the clamping member 19 has, for example, an annular shape. The clamping member 19 can be clamped to the mounting 9 or rather the segments by means of screws 20 which are screwed into tapped holes 21 in the mold member 9. A quick and easy removal of the partial profiled segments is possible by releasing the screws 20, for example in order to clean the areas of the interfaces 2.

FIG. 2 does not show the rearward air-discharge channels or similar ones as it is known to the man skilled in the art based on his technical know-how that, in dependency of the shape of the individual profiled segments, additional ones are to be arranged, for example, in the separating area between the individual profiled segments.

The invention is not to be limited to the illustrated exemplary embodiment, rather many modification possibilities exist for the man skilled in the art within the scope of the invention.

I claim:

1. A method for the manufacture of a profiled segment which forms a part of a tire-vulcanization mold, comprising the steps of constructing a one piece, annular, profiled segment having a tread pattern formed on a radially inner surface thereof; and, thereafter, dividing the one piece, annular, profiled segment along at least one separating interface having conforming irregular and nonplanar opposing surface patterns extending generally parallel to a plane of rotation of the tire vulcanization mold into at least two partial profiled segments so that said partial profiled segments will fit together only when said irregular and nonplanar surface patterns directly oppose one another.

2. The method according to claim 1, wherein said dividing step includes selectively choosing said irregular and nonplanar surface patterns so that a location of said separating interface intersects areas of the tread pattern requiring ventilation when said partial profiled segments form a part of the tire-vulcanization mold.

3. The method according to claim 2, wherein the dividing is done by means of a spark-erosion cutting operation.

* * * * *